United States Patent [19]
Schlansker et al.

[11] Patent Number: 5,664,135
[45] Date of Patent: Sep. 2, 1997

[54] APPARATUS AND METHOD FOR REDUCING DELAYS DUE TO BRANCHES

[75] Inventors: Michael S. Schlansker, Los Altos; Vinod Kathail, Cupertino, both of Calif.

[73] Assignee: Hewlett-Packard Company, Palo Alto, Calif.

[21] Appl. No.: 313,980

[22] Filed: Sep. 28, 1994

[51] Int. Cl.$^6$ ............................................. G06F 13/00
[52] U.S. Cl. ........................... 395/377; 395/383; 395/389
[58] Field of Search ................................. 395/375, 377, 395/383, 389

[56] References Cited

U.S. PATENT DOCUMENTS

| | | |
|---|---|---|
| 3,570,006 | 3/1971 | Hoff et al. . |
| 3,577,189 | 5/1971 | Cocke et al. ........................... 340/172.5 |
| 4,991,080 | 2/1991 | Emma et al. ............................ 364/200 |
| 5,317,703 | 5/1994 | Hiraoka et al. ......................... 395/375 |

FOREIGN PATENT DOCUMENTS

| | | | |
|---|---|---|---|
| 0 135 844 A2 | 4/1985 | European Pat. Off. .......... | G06F 9/32 |
| 0236745 | 9/1987 | European Pat. Off. .......... | G06F 9/38 |
| 2250840 | 6/1992 | United Kingdom .............. | G06F 9/38 |

OTHER PUBLICATIONS

H. C. Young and J. R. Goodman, "A Simulation Study of Architectural Data Queues and Prepare-to-Branch Instruction", Proceedings of the IEEE International Conference on Computer Design, VLSI in Computers ICCD '84, Port Chester, NY, 1984, pp. 544–549.

Jack W. Davidson and David B. Whailley, "Reducing the Cost of Branches by Using Registers", Department of Computer Science, University of Virginia, 1990 IEEE.

*Primary Examiner*—Jack B. Harvey
*Assistant Examiner*—John Travis

[57] ABSTRACT

An improved computer architecture and instruction set that reduces the delays produced by branch instructions. The invention utilizes a branch processor having a branch memory for storing information specifying a plurality of branch instructions that are contained in a code sequence. The branch memory stores information specifying the target address of each branch instruction and the location of the branch instruction with respect to the beginning of the code sequence. The branch processor receives the results of the various comparisons that determine if the conditions associated with the various branches stored in the branch memory are satisfied. The branch processor preferably stores the identity of the branch that is closed to the beginning of the code sequence for which the condition associated therewith has been satisfied. This branch will be referred to as the highest branch enabled. The actual branching operation is carded out in response to the receipt of an execute branch instruction which specifies one or more of the branches stored in the branch memory. If one of the branches specified in the execute branch instruction matches the highest branch enabled, then the code sequence continues at the target address of the highest branch enabled.

17 Claims, 3 Drawing Sheets

APPARATUS AND METHOD FOR REDUCING DELAYS DUE TO BRANCHES

FIELD OF THE INVENTION

The present invention relates to computer systems, and more particularly, to an improved machine architecture and instruction set which reduces delays due to branch instructions.

BACKGROUND OF THE INVENTION

In spite of the numerous improvements in the operating speed of computers, there continues to be a need for computers that operate at higher effective throughput. Improved computational speed has been obtained by increasing the speed with which the computer hardware operates and by introducing parallel processing in one form or another. One class of improvements obtained through parallel processing reduces the delays due to the latency time associated with the computer instructions. For the purposes of this discussion, the latency time is defined as the delay between the initiation of an instruction and the time the instruction is actually executed.

Consider an instruction which references data stored in a specified register. This instruction may require 5 machine cycles to execute. In the first cycle, the instruction is fetched from memory. In the second cycle, the instruction is decoded. In the third cycle, the contents of the register are fetched. In the fourth cycle, the instruction is actually executed, and in the fifth cycle, data is written back to the appropriate location. If one were to wait until the instruction execution is completed, only one instruction would be executed every 5 machine cycles.

The effects of the latency time are reduced in pipelined processors by initiating the processing of a second instruction before the actual execution of the first instruction is completed. In the above example, 5 instructions would be in various stages of processing at any given time. The processor would include 5 pipeline stages working in parallel, each stage carrying out one of the 5 tasks involved in executing an instruction. While the data for the oldest instruction is being written back to memory or a register, the next to the oldest instruction would be executed by the execution hardware. The register contents needed for the instruction to be executed next would be simultaneously retrieved by the register hardware, and so on.

In principle, pipelined processors can complete the execution of one instruction per machine cycle when a known sequence of instruction is being executed. Unfortunately, computer programs include branch instructions which interrupt the instruction flow. Consider the instruction sequence if x=0 then goto newstart y=z goto somewhere newstart: y=k The first instruction is translated to a branch instruction based on the contents of x. By the time this instruction reaches the execution unit in the pipeline, several additional instructions will have entered the pipeline. However, the computer has no method to determine whether the instruction following the branch should by "y=z" or "y=k" until it actually executes the branch. Thus, it is impossible to determine which instructions should be loaded in the pipeline after the branch instruction. Prior art systems have attempted to reduce branch delays by predicting the outcome of the branch instruction and then loading the instructions corresponding to the predicted outcome. However, there is no prediction scheme which is 100% accurate. Hence, delays are still encountered.

If the wrong sequence of instructions is loaded, the computer must be stalled for a time sufficient to empty and refill the pipeline. Thus, if the instructions corresponding to "y=z" were loaded after the first branch instruction and the branch is taken, then the pipeline must be flushed and the instructions corresponding to "y=k" loaded for execution. This delays the execution of the program by a time that depends on the number of stages in the pipeline.

Branch instructions also cause memory related latency delays. Most modern computer systems utilize cache subsystems to improve the effective access time to the computer's main memory. The cache consists of a high speed associative memory which stores the most recently used instructions and data. When the processor requests the contents of a particular memory location, the cache processor intercepts the request and checks the cache memory to determine if the requested information is in the cache. If the requested information is in the cache, it is returned to the processor with minimal delay. If, however, the requested information is in the main memory, the processor is stalled while the cache retrieves the information. Since main memory speeds are significantly slower than the cache speed, such cache "misses" introduce significant delays.

Branch instructions often result in cache misses. A branch often causes the computer to continue operation at a memory location that was far from that of the branch instruction. Caches store the most recently used information and information that is close to this information in the main memory. Hence, if the branch is to a distant location and not recently visited, it is unlikely that the next instruction is in the cache.

Another problem encountered with prior art systems for dealing with branch instructions is the inability of these systems to use data generated in processing a first branch instruction to reduce the processing needed for a second branch instruction. A conditional branch instruction may be viewed as comprising three linked instructions. The first instruction computes the target address, i.e., the address of the next instruction to be executed if the branch is taken. The second instruction computes the branch outcome, the outcome of which determines if the branch is to be taken. The third instruction is the actual transfer of control.

In many cases, a number of branch instructions having the same target address will be present in the program. Hence, in principle, a significant amount of processing time could be saved if the results of the target address calculation from the first instruction could be used in the remaining instructions. Prior art computer architectures do not provide an effective method for accomplishing this; hence, the target address is recomputed for each branch. Similarly, the comparison calculation may determine the outcome of several branches.

Finally, prior art systems only provide a means for executing the computations corresponding to one branch instruction at any given time. One important strategy in reducing the effects of latency times involves moving instructions within the instruction sequence. For example, if the compiler knows that a load operation has a latency delay, the compiler can move other instructions in the instruction sequence so that these instructions are being executed during the latency period. This strategy reduces the effects of the latency delay. Unfortunately, the compiler's ability to fill-in these latency delays by performing computations needed for branch instructions is limited by the inability to complete the entire branch computation. For example, prior systems do not provide an effective means for separating the target address computation from the comparison operation to allow the target address to be computed out of order. At most, prior art systems can work on one branch instruction at a time, and if the information for that branch instruction is not available, the branch information cannot be computed ahead of time.

The computer architecture and instruction set taught in U.S. Pat. Ser. No.: 08/058,858 mentioned above provides a significant improvement over the prior art with respect to the above-described problems. The computer system described therein uses a register file, connected to the instruction processor, to facilitate the execution of branch instructions. The register file includes a number of registers. Each register is used to store information needed in executing a branch instruction. Each register includes space for storing a target address of a branch instruction and space for storing a flag having first and second states, the first state indicating that a branch instruction referencing the register should cause the instruction processor to branch to the instruction specified by the target address when an execute branch instruction referencing the register is executed. The second state indicates that the instruction processor should continue executing instructions in the sequential order when an execute branch instruction referencing the register is executed by the instruction processor. The computer system utilizes a "prepare to branch" instruction to assign a register and load it with a target address. Conditional branch instructions are implemented with the aid of a compare instruction which sets the flag in a register referenced by the instruction if a specified condition is met.

A prefetch instruction is sent to a cache memory when a flag in one of the registers is set to indicate that a branch is to be taken. The prefetch does not wait for the ultimate value of the flag. The prefetch instruction causes the cache line containing the target address to be loaded into the cache if the cache line in question is not already in the cache.

The register referenced by prepare to branch, execute branch, and compare instructions is specified by a pointer register. The contents of the pointer register may be set with the aid of a separate instruction. Alternatively, the contents of the pointer register may be set by an execute branch instruction using data stored in the register file.

While this computer architecture significantly reduces the delays caused by branches, it is less than optimum on computers which issue multiple instructions per machine cycle, such as super scalar or VLIW computers. On such computers, two or more instructions are being executed on each machine cycle. Hence, multiple branches can, in principle, be processed at the same time.

Even in architectures that execute only one instruction per machine cycle, the determination of the outcome of a branch can be used to effect actions being taken on a plurality of registers. As noted above, the system described above preferably uses prefetch instructions to reduce the effects of memory latency time. Consider the case in which the computer determines that a particular branch will be taken and there were a number of branches on the alternate path that have already been assigned to other registers. Prefetch instructions for the addresses indicated in these other registers are also being processed by the register control hardware. Since these addresses will not be referenced, it is a waste of computer resources to continue with the prefetching operations. In fact, the movement of the corresponding data into the cache may actually reduce the cache's performance by displacing more useful data from the cache.

In general, the register control hardware will, in effect, have a queue of prefetch instructions that it is feeding to the cache. If it is known that a particular branch is not being taken, any corresponding prefetch instructions that have not yet been issued can, in principle, be removed from the queue thereby increasing the priority of data that is more likely to be accessed through the cache. Unfortunately, the control hardware must trace through a linked list having one entry per register to determined which registers and corresponding prefetch instructions are to be retired by any given branch outcome determination. The time needed to traverse this linked list renders this approach untenable.

Broadly, it is the object of the present invention to provide an improved computer architecture and instruction set for executing branch instructions.

It is a further object of the present invention to provide a computer architecture which more efficiently executes multiple branches from a source program in a single machine cycle.

It is a still further object of the present invention to provide a computer architecture which reduces the number of unnecessary prefetch instructions that reach the cache.

These and other objects of the present invention will become apparent to those skilled in the art from the following detailed description of the invention and the accompanying drawings.

SUMMARY OF THE INVENTION

The present invention is an improved computer architecture and instruction set that reduces the delays produced by branch instructions. A data processing system according to the present invention includes an instruction processor for sequentially executing the instructions of a program. The instructions include a branch instruction that causes the instruction processor to execute the instruction specified by a target address related to the branch instruction as the next instruction in the program instead of the next instruction in the program sequence if a condition associated with the branch instruction is satisfied. A data processing system according to the present invention includes a branch processor having a branch memory for storing information specifying a plurality of branch instructions that are contained in a code sequence. The branch memory stores information specifying the target address of each branch instruction and the location of the branch instruction with respect to the beginning of the code sequence. The branch processor receives the results of the various comparisons that determine if the conditions associated with the various branches stored in the branch memory are satisfied. The branch processor preferably stores the identity of the branch that is closest to the beginning of the code sequence for which the condition associated therewith has been satisfied. This branch will be referred to as the highest branch enabled. The actual branching operation is carried out in response to the receipt of an execute branch instruction which specifies one or more of the branches stored in the branch memory. If one of the branches specified in the execute branch instruction matches the highest branch enabled, the next instruction executed by the data processing system will be the target address of the highest branch enabled. If not, the next instruction will be the instruction following the execute branch instruction. In the preferred embodiment of the present invention, the branch processor also issues prefetch instructions to the cache memory that normally supplies data to the central processing unit. In this embodiment, the branch memory also stores information specifying the order in which prefetch instructions for the target address corresponding to the various stored branches are to be sent. If, prior to a prefetch instruction being sent, the branch processor determines that the highest branch enabled is closer to the beginning of the code sequence than the branch corresponding to a particular target address, then the branch processor prevents the prefetch instruction corresponding to that target address from being sent to the cache memory. Similarly, if the condition corresponding to a particular branch instruction is determined not to be satisfied prior to the corresponding prefetch instruction being sent, the branch processors prevents the prefetch instruction from being issued.

DETAILED DESCRIPTION OF THE INVENTION

Figure 1:
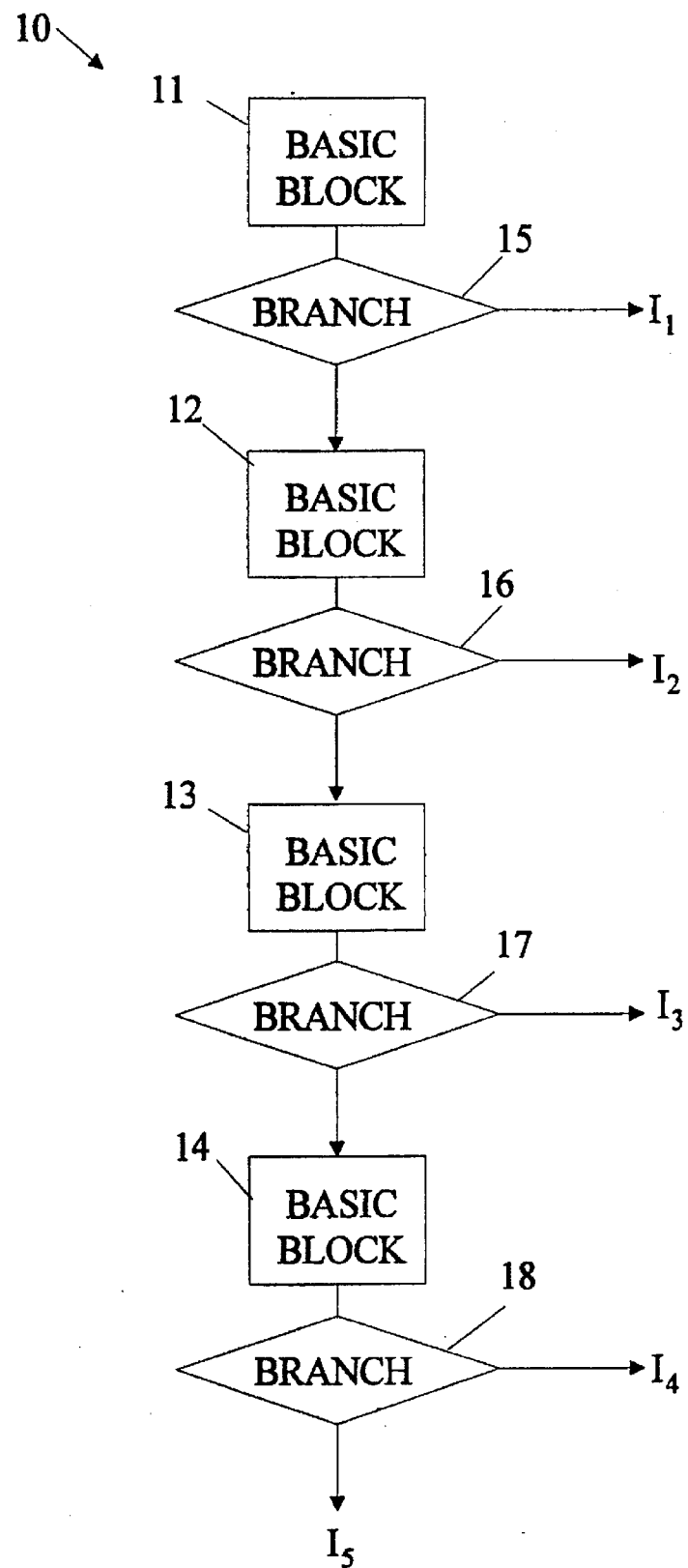
FIG. 1 is a flow chart for an exemplary superblock.

The present invention achieves its advantages by treating a number of branches as a group and by separating the operations inherent in a conventional branch into sub-operations that can be performed separately. The present invention treats a number of branches associated with a block of code that will be referred to as a superblock as a group. A superblock is a sequence of basic blocks that are linked by branch instructions and which is entered at the beginning of the first basic block. For the purposes of this discussion, a basic block is a block of code that is entered at the beginning of the block and has a single branch at the end. An exemplary superblock is shown in FIG. 1 at 10. Superblock 10 includes basic blocks 11–14 which are linked by branches 15–18, respectively. In the preferred embodiment of the present invention, the branches linking the basic blocks are chosen to be the ones that are expected to be the most likely to occur. The less likely branches lead to code outside of the superblock. The less likely outcomes of branches 15–18 are instructions $I_1$–$I_4$, respectively. If one of these outcomes is not taken, then the superblock transfers control to instruction $I_5$ which will be referred to as the fall through instruction in the following discussion.

To simplify the following discussion, first consider a single conditional branch instruction. Such an instruction causes the next instruction to be executed by the computer to be either the instruction after the branch instruction or the instruction located at a target address specified in the branch instruction. In the general case, the choice of next instruction is determined by comparing two arguments that are specified in the branch instruction. A branch instruction of the form branch to address A if the contents of a specified register are 0 is an example of such a conditional branch instruction. If the contents of the register are not 0, then the next instruction is the one following the branch instruction in the program sequence.

The instruction may be viewed as having 3 sub-operations that are carried out in sequence in conventional computer systems. The first sub-operation computes the target address. The target address is often specified with reference to a register, and hence, some computation may be needed to generate the actual address. For example, a target address consisting of the contents of a specified register with, perhaps, an offset added to the contents will be familiar to those skilled in the computer arts.

The second sub-operation involves the comparison operation described above to determine if the branch is to be taken. If the branch is to be taken, the comparison may set a bit that is used by the third operation.

The third sub-operation is the actual branch operation, i.e., changing the program counter to the target address if the condition specified in the comparison operation was met. The first two operations may be viewed as setup operations for the third operation.

In conventional computer systems, the three operations are executed in sequence when the computer encounters a branch instruction. This rigid execution prevents the compiler from moving the sub-operations to provide more efficient use of the computer's resources. In the prior art, the target address is computed at the time the comparison operation is performed, and the branch is taken immediately after the comparison. Hence, the information needed for a conditional branch instruction cannot be computed early because the sub-operations are performed in this rigid sequence. In addition, if the branch is taken, the next instruction may not be in the cache, and hence, the processor is forced to stall while the instruction at the target address is loaded into the cache.

In contrast, the separation of the branch instruction into the component sub-operations allows the target address to be computed as soon as possible, since the arguments for the comparison are not needed. Hence, this work may be used to fill in the latency periods of other instructions. Similarly, the comparison can be made as soon as the arguments are known; hence, this work can also be moved to fill in the latency period of some other instruction. Finally, a prefetch instruction may be sent to the cache memory to assure that the instruction at the target address is in the cache when the branch is taken. This prefetch instruction may be issued at the time the target address is computed. In prior art systems, a prefetch operation to the cache is not of much help, since the branch will be executed immediately after the target address computation; hence, very little advanced warning is available.

Figure 2:
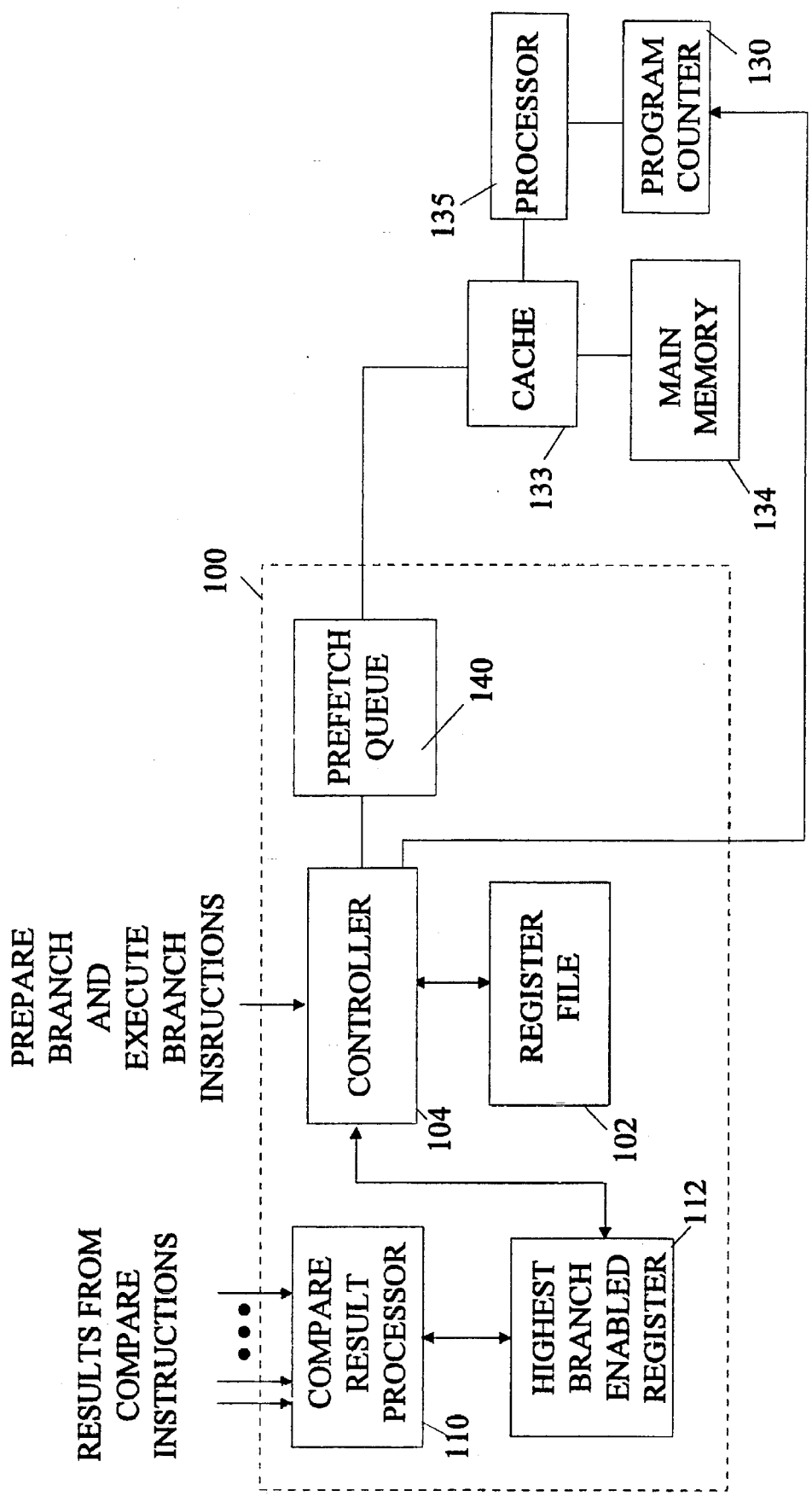
FIG. 2 is a block diagram of a branch processor according to the present invention and the other elements of a typical data processing system.

The above description was in reference to a single branch instruction. In the present invention, the branch instructions in a superblock are treated as a group. Refer now to FIG. 2 which is a block diagram of a branch processor 100 according to the present invention. Data specifying each branch in the superblock is stored in a register file 102. The data includes the target address associated with the branch and the position of the branch in the superblock. In the following discussion, the branches are numbered starting with the branch closest to the beginning of the super block. The branch closest to the beginning of the super block will be referred to as the highest branch. Other optional information that may be stored in register file 102 will be discussed in more detail below.

Figure 3:
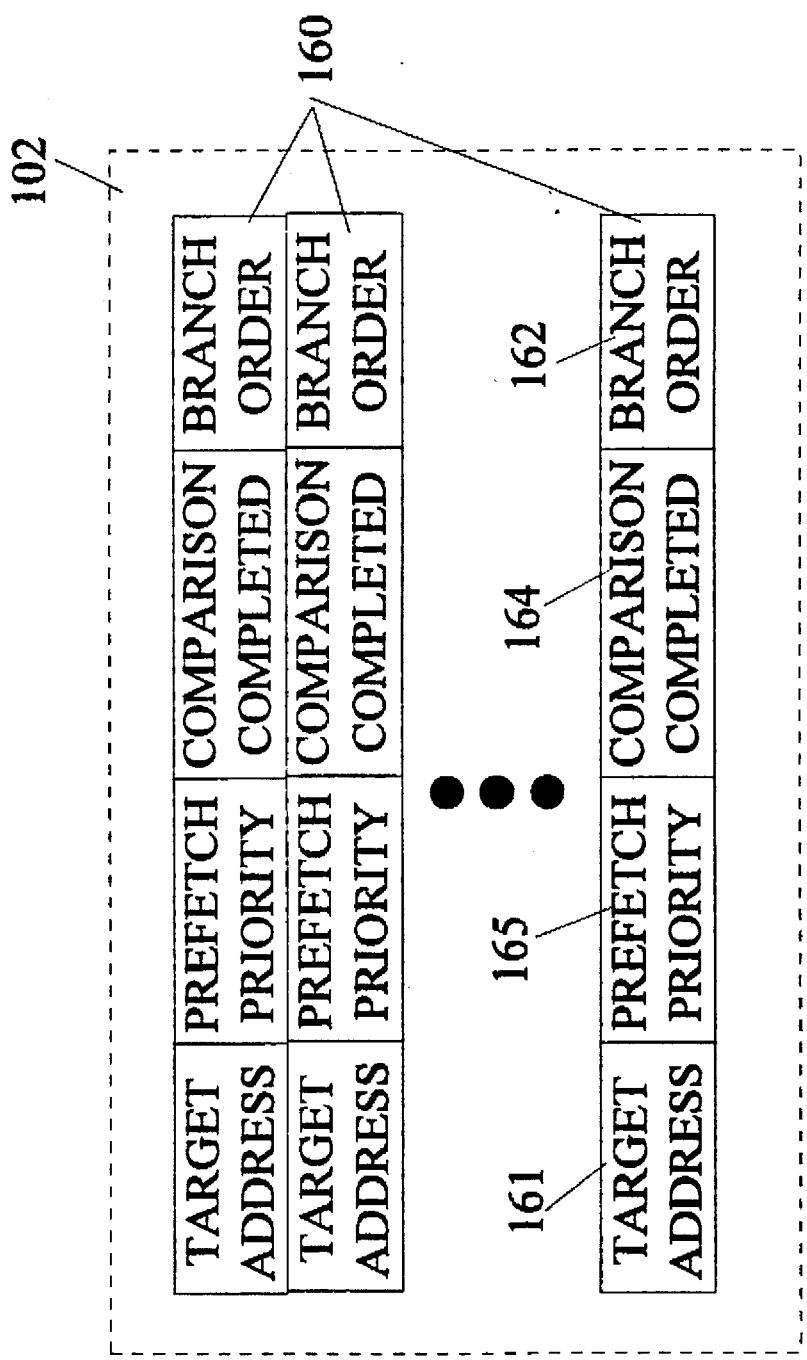
FIG. 3 is a more detailed block diagram of the register file shown in FIG. 2.

The branch data is loaded into register file 102 by prepare to branch (PT) instructions that are generated by the compiler and processed by a controller 104. A PT instruction may specify the entire superblock or merely one of the branches in the superblock. In the later case, a number of separate PT instructions will be needed to initialize branch processor 100. When the PT instructions are completed, there will be one register in register file 102 corresponding to each branch in the superblock. Refer now to FIG. 3 which is a block diagram of a register file that is suitable for use with the present invention. Each register 160 will contain the target address 161 of the corresponding branch instruction and the location of the branch instruction with reference to the beginning of the superblock. The location information may be stored in a field of the register 162, or it may be implied from the location of the register in the register file itself.

The compare instructions corresponding to the superblock reference the individual registers in the register file by specifying the branch position in the superblock. As the results of the various compare instructions are received, they are processed by a processor 110 which updates a register 112 which holds the identity of the branch closest to the beginning of the superblock for which the condition specified in the corresponding comparison instruction was satisfied. This branch will be referred to as the highest branch enabled. After all of the comparisons are completed, register 112 holds the identity of the branch that is to be taken out of the superblock.

It will be noted that processor 110 is shown as receiving multiple inputs. In superscalar and VLIW computer architectures, a plurality of comparison instructions may be executed in each machine cycle. Hence, the results of more than one comparison operation may be available in any given machine cycle. Processor 110 compares all of the inputs received by it in a given machine cycle with the contents of register 112 and then returns the identity of the highest branch for which the corresponding comparison condition was satisfied to register 112. After all of the comparison instructions have been executed, register 112 specifies the register in register file 102 that contains the target address for the branch that is to be taken out of the superblock.

The PT and compare instructions may be viewed as setup instructions for the actual branch instruction (EB), i.e., the instruction that causes the program counter 130 to point to the target address if the branch is taken. In the preferred embodiment of the present invention, the EB instruction includes a mask having one bit for each of the possible registers in register file 102. If the bit is set to a "1", the branch is enabled for testing. The EB instruction will cause the computer to jump to the target address of the highest branch enabled provided that branch is not masked in the EB instruction. If the highest branch enabled at the time the EB instruction is received is masked by the EB instruction, the branch falls through.

The ability to test multiple branches in one instruction provides advantages in a number of situations. In many cases, the probability that any of the branches will be taken is known to be very small. That is, $I_5$ shown in FIG. 1 will be the exit from the superblock in the vast majority of cases. For example, this situation would be expected if the branches in the superblock were all associated with error conditions. Instead of executing four separate EB instructions as shown in FIG. 1, a single EB instruction in which all 4 branches were enabled could be executed at the end of the superblock. If register 112 points to a register in register file 102 corresponding to one of the enabled branches, the program can transfer control to the target address shown in the register. Thus, a significant number of EB instructions can be eliminated which, in turn, improves the speed with which the program executes in the absence of errors.

The above-described scheme assumes that the superblock can operate to completion even if one or more of the branches that would have been taken if executed at the original location were delayed. In many cases, the compiler or the programmer can assure that this condition is met.

The above scheme for combining of branches assumes that all of the branches are combined into one branch at the bottom of the superblock. As noted above this is only efficient in cases in which executing the code to the branch point is efficient and safe even in those cases in which an earlier branch would have been taken had not the branches been collapsed into one branch. In principle one could collapse the branches in groups. For example branches 15 and 16 could be collapsed into a single branch placed at the location of branch 16, and the remaining branches collapsed into a branch at the bottom of the superblock.

Refer again to FIG. 2. In modern computing systems, the actual data and instructions supplied to the processor 135 are stored in a cache memory 133 prior to being delivered to processor 135. If the data is not in cache 133 when processor 135 requests the data, processor 135 will be stalled until cache 133 fetches the data from main memory 134. This situation is referred to as a cache miss. Cache misses reduce the efficiency of the computer system, and hence, are to be avoided. The present invention provides a means for reducing the number of cache misses.

In the preferred embodiment of the present invention, controller 104 issues prefetch commands to cache 133 to allow cache 133 to request information from main memory 134 in advance, thereby reducing the number of cycles in which the processor is stalled due to cache misses. The prefetch instructions are issued in an order specified by information in the PT instructions. This information is also stored in the corresponding register in register file 102 in the preferred embodiment of the present invention. The information may be generated by the programmer or the compiler.

Cache 133 is capable of receiving only a finite number of prefetch instructions, typically one per machine cycle. Hence, the prefetch instructions may be placed in prefetch queue 140 in an order specified in the PT instruction. The ordering information may also be stored in register file 102 in a field 165 of the register corresponding to the branch instruction. Alternatively, the prefetch instructions may be issued directly to cache 133 without being placed in a queue. In this case, the ordering information in field 165 is referenced by controller 104 in deciding which prefetch instruction to issue next.

While a prefetch instruction is awaiting issuance, it may become clear that the data specified may never be needed. In this case, controller 104 causes the prefetch instruction to be removed from the queue or marked in some manner that will prevent the prefetch instruction from being issued to cache 133. Consider the case in which a prefetch instruction refers to the information stored at the target address of a branch in the superblock. If the condition associated with the branch is known not to be satisfied, then the information at the target address will not be requested by the processor. Hence, if the corresponding comparison instruction indicates that the condition specified therein is not satisfied, controller 104 removes the prefetch instruction for the target address from the queue. Similarly, consider the case in which register 112 points to a branch which is above the branch corresponding to a particular prefetch instruction. In this case, it is known that the branch corresponding to the prefetch instruction will never be executed even if the condition associated with it is satisfied, since the branch specified in register 112, or a branch above it, will be taken. Hence, controller 104 also monitors the contents of register 112 and removes any prefetch instructions from queue 140 that reference the target address of a branch below the highest branch enabled.

There may also be cases in which one only wishes to execute a prefetch instruction if it is known for certain that the corresponding branch is to be taken. For example, there are cases in which the prefetch instruction itself may cause some system delays. In such cases, controller 104 only issues the prefetch instruction when the branch in question is the highest branch enabled, and it is known that the comparison instruction for all other branch instructions above the branch instruction have been evaluated. In this case, controller 104 must keep track of the branch instructions for which comparison instructions have not yet been executed. In the preferred embodiment of the present invention, a field such as field 164 shown in FIG. 3 is provided in each of the registers in register 102 to keep track of which comparison instructions have not been completed.

The above-described embodiments of the present invention utilize a register file for storing the information relevant to each branch, and a register 112 for storing the identity of the branch that is to be taken. However, it will be apparent to those skilled in the art that other storage means may be used for this information. For example, all or part of the information could be stored in a conventional memory.

It should also be noted that the results of the update computations used to maintain the state of register 112 may be available within processor 110 before these results actually appear in register 112. In this case, systems that perform a comparison operation just before the branch operation in the same machine cycle may be implemented.

Various modifications to the present invention will become apparent to those skilled in the art from the foregoing description and accompanying drawings. Accordingly, the present invention is to be limited solely by the scope of the following claims.

What is claimed is:

1. A data processing system for executing a program comprising an instruction sequence including a plurality of instructions in an ordered sequence, said ordered sequence having a beginning and said ordered sequence including a plurality of branch instructions, each said branch instruction causing said data processing system to execute an instruction specified by a target address if a specified condition is satisfied, said data processing system including a branch processor comprising:

means for storing information specifying a plurality of said branch instructions, said information including a target address corresponding to each said branch instruction and the location of said branch instruction in said ordered sequence relative to said beginning of said ordered sequence;

means for receiving a prepare to branch instruction, said prepare to branch instruction including information specifying a target address and a location corresponding to one of said branch instructions and for causing said information to be stored in said storing means;

compare result means for receiving information indicating that said condition related to one of said branch instructions has been satisfied;

means for receiving an execute branch command, said execute branch command identifying one of said branch instructions having information stored in said storing means; and control means, responsive to receiving said execute branch command, for causing said data processing system to execute said instruction specified by said target address corresponding to said identified branch instruction if said condition related to said identified branch instruction was satisfied and no said condition related to a branch instruction located closer to the beginning of said ordered sequence than said identified branch instruction was satisfied.

2. The data processing system of claim 1 wherein said compare result means comprises a register for storing the identity of said branch instruction closest to the beginning of said ordered sequence for which said condition was satisfied.

3. The data processing system of claim 2 wherein said execute branch command includes information specifying a plurality of branch instructions and wherein said control means includes means for determining if any of said branch instructions specified in said execute branch command is said branch instruction whose identity is stored in said register and for causing said data processing system to execute said instruction identified by said target address corresponding to said branch instruction whose identity is stored in said register.

4. The data processing system of claim 1 further comprising cache memory means for storing data normally stored in a main memory and for providing said data directly to a central processing unit, said cache memory means comprising means for receiving a prefetch instruction including a data address in said main memory and means, responsive to the receipt of said prefetch instruction for causing the data stored at said data address to be copied to said cache memory if a copy of said data is not already in said cache memory, wherein said control means in said branch processor further comprises means for sending one of said prefetch instructions having a data address matching one of said target addresses to said cache memory.

5. The data processing system of claim 4 wherein said storing means in said branch processor further comprises means for storing information specifying an initial order in which said prefetch instructions are to be sent to said cache memory.

6. The data processing system of claim 5 wherein said compare result means comprises a register for storing the identity of said branch instruction closest to the beginning of said ordered sequence for which said condition was satisfied and wherein said control means further comprises means for preventing initiation or termination of said prefetch instructions from being sent for any target address having a corresponding branch instruction that is farther from the beginning of said instruction sequence than said branch instruction identified by said register.

7. The data processing system of claim 5 wherein said compare results means further comprises means for receiving information specifying that said condition related to one said branch instructions was not satisfied; and said control means further comprises means for preventing initiation or termination of said prefetch instruction having a data address equal to said target address of said branch instruction whose condition was not satisfied.

8. A method of operating a data processing system to process branch operations having conditions and being associated with an ordered sequence of instructions wherein a branch operation has associated therewith a location in the ordered sequence, the data processing system having a plurality of storage locations for storing branch information, comprising the steps of:

in response to a prepare to branch instruction corresponding to a branch operation, wherein a prepare to branch instruction specifies the location of the corresponding branch operation, loading branch information including the location into one of the storage locations;

in response to a compare instruction associated with a branch operation, computing the condition for the branch operation;

computing a target address for a branch operation having information stored in a storage location and storing the target address in the storage location for the branch operation;

in response to an execute branch instruction specifying a branch operation stored in one of the storage locations, changing the program counter to the target address for the branch operation unless the condition of a branch instruction located closer to the beginning of the ordered sequence of instructions to which the branch belongs was satisfied.

9. The method of processing branch operations according to claim 8, wherein in processing the instructions of the ordered sequence of instructions, for each branch operation in the ordered sequence of instructions, dividing the branch operation into a prepare to branch instruction, a compare instruction, and an execute branch instruction.

10. The method of processing branch operations according to claim 9, wherein a plurality of prepare to branch instructions are processed prior to executing any execute branch instructions.

11. The method of processing branch operations according to claim 9, wherein all prepare to branch instructions are executed prior to executing any compare instructions.

12. The method of processing branch operations according to claim 9, wherein all prepare to branch instructions and all compare instructions are executed prior to executing any execute branch instructions.

13. The method of processing branch operations according to claim 9, further comprising the step of:

in response to results from the compare instructions, updating a register containing the identity of the branch position for the branch closest to the beginning of the superblock for which the condition for the branch operation was satisfied.

14. The method of processing branch operations according to claim 8, wherein each execute branch instruction may correspond to a plurality of branch operations and wherein the execute branch instruction includes a mask for indicating to which branch operations the execute branch instruction corresponds, and wherein the step of changing the program counter further comprises the step of changing the program counter to the highest branch enabled provided that branch is not masked in the execute branch instruction.

15. The method of processing branch operations according to claim 8, further comprising the step of:

subsequent to computing the target address for a branch, prefetching instructions corresponding to the branch.

16. The method of processing branch operations according to claim 15, further comprising the step of if the compare instruction corresponding to a branch indicates that the branch will not be taken, the prefetch operation includes avoiding prefetching instructions corresponding to the branch.

17. The method of processing branch operations according to claim 8, further comprising the step of prefetching instructions corresponding to a plurality of branch operations in an order specified by the prepare to branch instructions corresponding to the plurality of branch operations.

* * * * *